United States Patent
Wang et al.

(10) Patent No.: US 11,499,057 B2
(45) Date of Patent: Nov. 15, 2022

(54) METHOD OF PREPARING TERPOLYMER-DOPED POLYANILINE SUPER-HYDROPHOBIC COMPOSITE ANTICORROSIVE PAINT

(71) Applicant: Shaanxi University of Science & Technology, Xi'an (CN)

(72) Inventors: Haihua Wang, Xi'an (CN); Liyu Sun, Xi'an (CN); Guiqiang Fei, Xi'an (CN); Yongning Ma, Xi'an (CN); Yanyu Li, Xi'an (CN)

(73) Assignee: Shaanxi University of Science & Technology

( * ) Notice: Subject to any disclaimer, the term of this patent is extended or adjusted under 35 U.S.C. 154(b) by 381 days.

(21) Appl. No.: 16/842,495

(22) Filed: Apr. 7, 2020

(65) Prior Publication Data

US 2020/0407566 A1 Dec. 31, 2020

(30) Foreign Application Priority Data

Jun. 26, 2019 (CN) .......................... 201910563526.3

(51) Int. Cl.
| | |
|---|---|
| C09D 5/08 | (2006.01) |
| C09D 4/00 | (2006.01) |
| C08G 73/02 | (2006.01) |
| C08F 2/04 | (2006.01) |
| C08F 220/22 | (2006.01) |
| C08F 220/32 | (2006.01) |
| C08F 220/56 | (2006.01) |
| C08K 5/14 | (2006.01) |
| C08K 5/23 | (2006.01) |

(52) U.S. Cl.
CPC ................ *C09D 5/084* (2013.01); *C08F 2/04* (2013.01); *C08F 220/22* (2013.01); *C08F 220/32* (2013.01); *C08F 220/56* (2013.01); *C08G 73/0266* (2013.01); *C08K 5/14* (2013.01); *C08K 5/23* (2013.01); *C09D 4/00* (2013.01); *C09D 5/08* (2013.01); *C08G 2150/90* (2013.01)

(58) Field of Classification Search
CPC ........ C09D 4/00; C09D 5/08; C08G 73/0266; C08G 2150/90
See application file for complete search history.

(56) References Cited

FOREIGN PATENT DOCUMENTS

CN 106675303 A * 5/2017 .......... C08F 283/008

OTHER PUBLICATIONS

Machine translation of CN106675303A. (Year: 2017).*

* cited by examiner

*Primary Examiner* — Catherine S Branch
(74) *Attorney, Agent, or Firm* — Maschoff Brennan

(57) ABSTRACT

The present invention discloses a method of preparing a terpolymer-doped polyaniline super-hydrophobic composite anticorrosive paint. The method includes: firstly by adopting solution polymerization, stirring a hydrophilic vinyl monomer, a fluorine-containing acrylate monomer and an oil-soluble initiator in a solvent evenly and carrying out a reaction for a period of time, then adding a functional acrylic monomer or long-chain acrylate monomer as a third monomer for further reaction for a period of time to obtain a fluorine-containing terpolymer surfactant; then mixing the fluorine-containing terpolymer surfactant with an aniline monomer and an oxidant evenly, and carrying out a reaction for a period of time to obtain super-hydrophobic polyaniline; and finally dispersing the prepared super-hydrophobic polyaniline evenly in a resin matrix to prepare the polyaniline super-hydrophobic composite anticorrosive paint with an excellent anticorrosive performance.

10 Claims, No Drawings

METHOD OF PREPARING TERPOLYMER-DOPED POLYANILINE SUPER-HYDROPHOBIC COMPOSITE ANTICORROSIVE PAINT

CROSS-REFERENCE TO RELATED APPLICATIONS

This application claims priority to Chinese Patent Application No. 201910563526.3 filed on Jun. 26, 2019, which is incorporated herein by reference.

TECHNICAL FIELD

The present invention belongs to the field of anticorrosive paints, and in particular relates to a method of preparing a terpolymer-doped polyaniline super-hydrophobic composite anticorrosive paint.

BACKGROUND

Metal corrosion has caused great losses in science and technology and economic construction. Coating an organic coating on the surface of a metal substrate is one of the common strategies for protecting against metal corrosion. However, the anti-corrosion performance of a resin matrix itself can no longer meet the anti-corrosion requirements. Therefore, a corrosion inhibitor is often added to improve the anti-corrosion performance of the resin matrix. Polyaniline can not only provide a physical barrier for an anti-corrosion coating, but also provide electrochemical protection for a metal, and thus is often used as the corrosion inhibitor to be compounded with the resin matrix. A hydrophobic or super-hydrophobic coating has good water resistance, can effectively prevent the diffusion of a corrosive medium on a metal surface, and has great development potential in the field of anticorrosion. It is of great significance to combine superhydrophobicity with the excellent performances of polyaniline to apply in the field of anticorrosion.

The preparation of the super-hydrophobic polyaniline is often realized by two methods, one is to modify the surface of polyaniline with a low surface-energy substance such as fluorine and siloxane, and the other is to construct a multi-classification micro-nano structure of polyaniline by copolymerization or modification with a surfactant. At present, the preparation of the super-hydrophobic polyaniline by modification with a surfactant usually involves firstly synthesizing polyaniline, and then modifying the surface of polyaniline with a common surfactant such as sodium dodecyl benzene sulfonate, cetyltrimethylammonium bromide and the like. The research in which the super-hydrophobic polyaniline is prepared by using the fluorine-containing terpolymer surfactant as a soft template and dopant during aniline polymerization, and then it is compounded with a resin matrix to prepare an anticorrosive paint has not been reported.

SUMMARY

An objective of the present invention is to provide a method of preparing a terpolymer-doped polyaniline super-hydrophobic composite anticorrosive paint. The present invention synthesize a polyaniline super-hydrophobic composite anticorrosive paint doped with a fluorine-containing terpolymer surfactant is synthesized for the first time. This method solves the problems of poor waterproofness and corrosion resistance of the resin matrix itself, and can greatly improve the long-acting anti-corrosion performance of metals when used as an anticorrosive paint.

In order to achieve the aforementioned objective, the technical solution provided by the present invention is as follows.

A method of preparing a terpolymer-doped polyaniline super-hydrophobic composite anticorrosive paint, includes the following steps:

by adopting solution polymerization, stirring a hydrophilic vinyl monomer, a fluorine-containing acrylate monomer and an oil-soluble initiator in a solvent evenly and carrying out a reaction, then adding a functional acrylic monomer or long-chain acrylate monomer as a third monomer for further reaction to obtain a fluorine-containing terpolymer surfactant;

mixing the fluorine-containing terpolymer surfactant with an aniline monomer and an oxidant evenly, and carrying out a reaction to obtain super-hydrophobic polyaniline; and dispersing the prepared super-hydrophobic polyaniline evenly in a resin matrix to prepare the polyaniline super-hydrophobic composite anticorrosive paint.

As a further improvement of the present invention, according to parts by weight, each 10-20 parts of the hydrophilic vinyl monomer is added with 12-24 parts of the fluorine-containing acrylate monomer, 20-40 parts of N,N-dimethylformamide and 0.4-0.8 parts of the oil-soluble initiator; and then added with 0.1-0.5 parts of the functional acrylic monomer or 0.2-1 parts of the long-chain acrylate monomer as the third monomer.

As a further improvement of the present invention, the reaction temperature for the solution polymerization is 80-90° C.

As a further improvement of the present invention, according to parts by weight, each 2.5-3.5 parts of the fluorine-containing terpolymer surfactant is added with 4-4.8 parts of the aniline monomer, 40-60 parts of water and 9.8-11.8 parts of an aqueous solution of the oxidant.

As a further improvement of the present invention, according to parts by weight, each 0.1-0.5 parts of the super-hydrophobic polyaniline which is used as a corrosion inhibitor, is uniformly compounded with 10 parts of the resin matrix.

As a further improvement of the present invention, the hydrophilic vinyl monomer is a mixture of one or more of 2-acrylamide-2-methylpropanesulfonic acid, 2-methacrylamide dodecyl sulfonic acid and 2-acrylamide-n-butyl sulfonic acid in any ratio;

the fluorine-containing acrylate monomer is a mixture of one or more of hexafluorobutyl acrylate, trifluoroethyl acrylate and dodecafluoroheptyl acrylate in any ratio;

the oil-soluble initiator is a mixture of one or more of benzoyl peroxide, tert-butyl ester benzoyl peroxide, azodiisobutyronitrile and azobisvaleronitrile in any ratio.

As a further improvement of the present invention, the functional acrylic monomer is a mixture of one or more of glycidyl methacrylate and glycidyl acrylate in any ratio.

As a further improvement of the present invention, the long-chain acrylate monomer is a mixture of one or more of octadecyl acrylate, hexyl acrylate, hexyl methacrylate, 2-ethylhexyl acrylate, 2-ethylhexyl methacrylate, n-octyl acrylate and iso-octyl acrylate in any ratio.

As a further improvement of the present invention, the oxidant is a mixture of one or more of ammonium persulfate, potassium persulfate, ferric chloride and potassium dichromate in any ratio.

As a further improvement of the present invention, the resin matrix is a mixture of one or more of epoxy resin, acrylic resin and alkyd resin in any ratio.

Compared with the prior art, the present invention has the following beneficial effects.

The fluorine-containing terpolymer surfactant synthesized by the present invention is used as a soft template and dopant for aniline polymerization, which not only reduces the surface energy of polyaniline, but also forms a multi-classification micro-nano structure of polyaniline. The introduction of the fluorine-containing acrylate monomer endows the surface of polyaniline with superhydrophobicity, and the introduction of the functional acrylic monomer or the long-chain acrylate monomer as the third monomer further improves the superhydrophobicity and compatibility of the system, while avoiding environmental problems that may be caused by using a super-hydrophobic anticorrosive paint prepared based on a perfluorinated compound. The prepared fluorine-containing terpolymer surfactant adopts the manner of solution polymerization, simplifies the synthesis process and does not need addition of an emulsifier; the process of preparing super-hydrophobic polyaniline of the present invention enables the prepared fluorine-containing terpolymer surfactant to have the functions of both a dopant and a soft template, and promotes the formation of the multi-classification micro-nano structure of polyaniline while reducing the surface energy of polyaniline; the introduction of the fluorine-containing acrylate monomer endows the coating with the superhydrophobic performance; and the introduction of the functional acrylic monomer or the long-chain acrylate monomer as the third monomer further improves the superhydrophobic performance of the coating and the long-term effect and stability of the superhydrophobic performance, improves the compatibility and weatherability of the system, and obviously improves the anticorrosion performance of the coating. The introduction of the fluorine-containing acrylate monomer and the third monomer in the product of the present invention can realize the unification of the superhydrophobic performance, the anticorrosive performance and the system compatibility, solves the problems of poor water resistance and anticorrosive performance of the resin matrix, and can greatly improve the long-term anticorrosive performance of the metal when the product is used as the anticorrosive paint.

DESCRIPTION OF THE EMBODIMENTS

The present invention discloses a method of preparing a terpolymer-doped polyaniline super-hydrophobic composite anticorrosive paint, which includes the following steps:

1) according to parts by weight, 10-20 parts of a hydrophilic vinyl monomer and 12-24 parts of a fluorine-containing acrylate monomer are mixed in 20-40 parts of N,N-dimethylformamide, heated to 80-90° C., and stirred for 1-2 h to obtain a mixed solution that has been mixed uniformly;

2) the mixed solution A is added with 0.4-0.8 parts of an oil-soluble initiator, and reacted at 80-90° C. for 0.5-2 h to obtain a component B;

3) the component B is added dropwise with 0.1-0.5 parts of a functional acrylic monomer or 0.2-1 part of a long-chain acrylate monomer as a third monomer, and continues to react for 3-4 h to prepare a fluorine-containing terpolymer surfactant;

4) 2.5-3.5 parts of the fluorine-containing terpolymer surfactant, 4-4.8 parts of an aniline monomer and 40-60 parts of water are uniformly mixed and reacted at room temperature for 1-2 h to obtain a milky white mixed solution C;

5) the mixed solution C is slowly added dropwise with 9.8-11.8 parts of an aqueous solution of an oxidant, continues to react for 12-24 h, then filtered with suction, washed, and dried to obtain super-hydrophobic polyaniline; and 6) 0.1-0.5 parts of the super-hydrophobic polyaniline as a corrosion inhibitor is uniformly compounded with 10 parts of a resin matrix to prepare the polyaniline super-hydrophobic composite anticorrosive paint doped with the fluorine-containing terpolymer surfactant.

The hydrophilic vinyl monomer is a mixture of one or more of 2-acrylamide-2-methylpropanesulfonic acid, 2-methacrylamide dodecyl sulfonic acid and 2-acrylamide-n-butylsulfonic acid in any ratio.

The fluorine-containing acrylate monomer is a mixture of one or more of hexafluorobutyl acrylate, trifluoroethyl acrylate and dodecafluoroheptyl acrylate in any ratio.

The oil-soluble initiator is a mixture of one or more of benzoyl peroxide, tert-butyl ester benzoyl peroxide, azodiisobutyronitrile and azobisvaleronitrile in any ratio.

The functional acrylic monomer is a mixture of one or more of glycidyl methacrylate and glycidyl acrylate in any ratio.

The long-chain acrylate monomer is a mixture of one or more of octadecyl acrylate, hexyl acrylate, hexyl methacrylate, 2-ethylhexyl acrylate, 2-ethylhexyl methacrylate, n-octyl acrylate and iso-octyl acrylate in any ratio.

The oxidant is a mixture of one or more of ammonium persulfate, potassium persulfate, ferric chloride and potassium dichromate in any ratio.

The resin matrix is a mixture of one or more of epoxy resin, acrylic resin and alkyd resin in any ratio.

The present invention will be described in further detail below with reference to examples, which are not intended to limit the present invention.

Example 1

1) According to parts by weight, 10 parts of 2-acrylamide-2-methylpropanesulfonic acid and 12 parts of trifluoroethyl acrylate were mixed in 20 parts of N,N-dimethylformamide, heated to 80° C., and stirred for 1 h to obtain a mixed solution A that had been mixed uniformly.

2) The mixed solution A was added with 0.4 parts of benzoyl peroxide, and reacted at 80° C. for 0.5 h to obtain a component B.

3) The component B was added dropwise with 0.1 parts of glycidyl acrylate as a third monomer, and continued to react for 3 h to prepare a fluorine-containing terpolymer surfactant.

4) 2.5 parts of the fluorine-containing terpolymer surfactant, 4 parts of an aniline monomer and 40 parts of water were uniformly mixed and reacted at room temperature for 1 h to obtain a milky white mixed solution C.

5) The mixed solution C was slowly added dropwise with 9.8 parts of an aqueous solution of ferric chloride, continued to react for 12 h, then filtered with suction, washed, and dried to obtain super-hydrophobic polyaniline.

6) 0.1 parts of the super-hydrophobic polyaniline as a corrosion inhibitor was uniformly compounded with 10 parts of alkyd resin to prepare the polyaniline super-hydrophobic composite anticorrosive paint doped with the fluorine-containing terpolymer surfactant.

Example 2

1) According to parts by weight, 20 parts of 2-methacrylamide dodecyl sulfonic acid and 24 parts of hexafluorobutyl acrylate were mixed in 40 parts of N,N-dimethylformamide, heated to 90° C. and stirred for 2 h to obtain a mixed solution A that had been mixed uniformly.

2) The mixed solution A was added with 0.8 parts of azobisvaleronitrile, and reacted at 90° C. for 2 h to obtain a component B.

3) The component B was added dropwise with 1 part of n-octyl acrylate as a third monomer, and continued to react for 4 h to prepare a fluorine-containing terpolymer surfactant.

4) 3.5 parts of the fluorine-containing terpolymer surfactant, 4.8 parts of an aniline monomer and 60 parts of water were uniformly mixed and reacted at room temperature for 2 h to obtain a milky white mixed solution C.

5) The mixed solution C was slowly added dropwise with 11.8 parts of an aqueous solution of potassium dichromate, continued to react for 24 h, then filtered with suction, washed, and dried to obtain super-hydrophobic polyaniline.

6) 0.5 parts of the super-hydrophobic polyaniline as a corrosion inhibitor was uniformly compounded with 10 parts of acrylic resin to prepare the polyaniline super-hydrophobic composite anticorrosive paint doped with the fluorine-containing terpolymer surfactant.

Example 3

1) According to parts by weight, 15 parts of 2-acrylamide-2-methylpropanesulfonic acid and 18 parts of hexafluorobutyl acrylate were mixed in 30 parts of N,N-dimethylformamide, heated to 85° C. and stirred for 1.5 h to obtain a mixed solution A that had been mixed uniformly.

2) The mixed solution A was added with 0.6 parts of benzoyl peroxide, and reacted at 85° C. for 1.25 h to obtain a component B.

3) The component B was added dropwise with 0.3 parts of glycidyl methacrylate as a third monomer, and continued to react for 3.5 h to prepare a fluorine-containing terpolymer surfactant.

4) 3 parts of the fluorine-containing terpolymer surfactant, 4.4 parts of an aniline monomer and 50 parts of water were uniformly mixed and reacted at room temperature for 1.5 h to obtain a milky white mixed solution C.

5) The mixed solution C was slowly added dropwise with 10.8 parts of an aqueous solution of potassium persulfate, continued to react for 18 h, then filtered with suction, washed, and dried to obtain super-hydrophobic polyaniline.

6) 0.3 parts of the super-hydrophobic polyaniline as a corrosion inhibitor was uniformly compounded with 10 parts of epoxy resin to prepare the polyaniline super-hydrophobic composite anticorrosive paint doped with the fluorine-containing terpolymer surfactant.

Example 4

1) According to parts by weight, 12.5 parts of 2-acrylamide-2-methylpropanesulfonic acid and 15 parts of hexafluorobutyl acrylate were mixed in 25 parts of N,N-dimethylformamide, heated to 90° C. and stirred for 1.25 h to obtain a mixed solution A that had been mixed uniformly.

2) The mixed solution A was added with 0.5 parts of benzoyl peroxide, and reacted at 90° C. for 1 h to obtain a component B.

3) The component B was added dropwise with 0.6 part of octadecyl acrylate as a third monomer, and continued to react for 3.25 h to prepare a fluorine-containing terpolymer surfactant.

4) 2.8 parts of the fluorine-containing terpolymer surfactant, 4.2 parts of an aniline monomer and 45 parts of water were uniformly mixed and reacted at room temperature for 1.25 h to obtain a milky white mixed solution C.

5) The mixed solution C was slowly added dropwise with 10.5 parts of an aqueous solution of ammonium persulfate, continued to react for 24 h, then filtered with suction, washed, and dried to obtain super-hydrophobic polyaniline.

6) 0.3 parts of the super-hydrophobic polyaniline as a corrosion inhibitor was uniformly compounded with 10 parts of epoxy resin to prepare the polyaniline super-hydrophobic composite anticorrosive paint doped with the fluorine-containing terpolymer surfactant.

Example 5

1) According to parts by weight, 17.5 parts of 2-acrylamide-n-butylsulfonic acid and 15 parts of dodecafluoroheptyl acrylate monomer were mixed in 35 parts of N,N-dimethylformamide, heated to 80° C. and stirred for 1.75 h to obtain a mixed solution A that had been mixed uniformly.

2) The mixed solution A was added with 0.7 parts of tert-butyl ester benzoyl peroxide, and reacted at 80° C. for 1.5 h to obtain a component B.

3) The component B was added dropwise with 0.3 parts of glycidyl acrylate as a third monomer, and continued to react for 3 h to prepare a fluorine-containing terpolymer surfactant. 4) 3.25 parts of the fluorine-containing terpolymer surfactant, 4.6 parts of an aniline monomer and 55 parts of water were uniformly mixed and reacted at room temperature for 1.75 h to obtain a milky white mixed solution C.

5) The mixed solution C was slowly added dropwise with 11 parts of an aqueous solution of an oxidant, continued to react for 15 h, then filtered with suction, washed, and dried to obtain super-hydrophobic polyaniline.

6) 0.4 parts of the super-hydrophobic polyaniline as a corrosion inhibitor was uniformly compounded with 10 parts of alkyd resin to prepare the polyaniline super-hydrophobic composite anticorrosive paint doped with the fluorine-containing terpolymer surfactant.

TABLE 1

Performance data of super-hydrophobic polyaniline composite paints prepared under different example conditions

| Sample Name | Contact Angle (°) | Water Absorption | Coating Resistance | $E_{corr}$ | $I_{corr}$ | Surface condition of the iron plate after a salt spray test for 480 h |
|---|---|---|---|---|---|---|
| Not doped with the surfactant | 52.8 | 24 | $6.85 \times 10^7$ | −651 | $7.26 \times 10^{-7}$ | Corrosion in a large area, and blistering and shedding of the coating |

TABLE 1-continued

Performance data of super-hydrophobic polyaniline composite paints prepared under different example conditions

| Sample Name | Contact Angle (°) | Water Absorption | Coating Resistance | $E_{corr}$ | $I_{corr}$ | Surface condition of the iron plate after a salt spray test for 480 h |
|---|---|---|---|---|---|---|
| Example 1 | 155.7 | 1.2 | $2.47 \times 10^{10}$ | −502 | $1.53 \times 10^{-8}$ | Corrosion at scratches, and slight blistering of the coating |
| Example 2 | 143.4 | 2.3 | $3.62 \times 10^{9}$ | −558 | $5.72 \times 10^{-8}$ | Corrosion at scratches, and occurrence of rust in a small area |
| Example 3 | 157.3 | 1.1 | $6.31 \times 10^{10}$ | −486 | $6.79 \times 10^{-9}$ | Corrosion at scratches, and slight blistering of the coating |
| Example 4 | 162.4 | 0.9 | $9.28 \times 10^{10}$ | −467 | $3.15 \times 10^{-9}$ | Corrosion only at scratches |
| Example 5 | 151.6 | 1.5 | $8.48 \times 10^{9}$ | −524 | $4.23 \times 10^{-8}$ | Corrosion at scratches, and little blistering of the coating |

Note: Not doped with the surfactant refers to that the unmodified polyaniline is directly compounded with the resin matrix, where the iron plate used in the experiment is tinplate, and the corrosion medium used in the salt spray test is a 3.5 wt % NaCl aqueous solution Example 6

1) According to parts by weight, 10 parts of a hydrophilic vinyl monomer and 12 parts of a fluorine-containing acrylate monomer were mixed in 20 parts of N,N-dimethylformamide, heated to 80° C. and stirred for 1 h to obtain a mixed solution A that had been mixed uniformly.

2) The mixed solution A was added with 0.8 parts of an oil-soluble initiator, and reacted at 90° C. for 2 h to obtain a component B.

3) The component B was added dropwise with 0.1 parts of a functional acrylic monomer or 0.2 part of a long-chain acrylate monomer as a third monomer, and continues to react for 3 h to prepare a fluorine-containing terpolymer surfactant.

4) 3.5 parts of the fluorine-containing terpolymer surfactant, 4.8 parts of an aniline monomer and 60 parts of water were uniformly mixed and reacted at room temperature for 2 h to obtain a milky white mixed solution C.

5) The mixed solution C was slowly added dropwise with 9.8 parts of an aqueous solution of oxidant, continued to react for 12 h, then filtered with suction, washed, and dried to obtain super-hydrophobic polyaniline.

6) 0.5 parts of the super-hydrophobic polyaniline as a corrosion inhibitor was uniformly compounded with 10 parts of a resin matrix to prepare the polyaniline super-hydrophobic composite anticorrosive paint doped with the fluorine-containing terpolymer surfactant.

The hydrophilic vinyl monomer was 2-acrylamide-2-methylpropanesulfonic acid. The fluorine-containing acrylate monomer was hexafluorobutyl acrylate and trifluoroethyl acrylate. The oil-soluble initiator was a mixture of benzoyl peroxide and tert-butyl ester benzoyl peroxide. The functional acrylic monomer was glycidyl methacrylate and glycidyl acrylate. The long-chain acrylate monomer was hexyl methacrylate. The oxidant was a mixture of ammonium persulfate and potassium persulfate.

Example 7

1) According to parts by weight, 20 parts of a hydrophilic vinyl monomer and 24 parts of a fluorine-containing acrylate monomer were mixed in 40 parts of N,N-dimethylformamide, heated to 90° C., and stirred for 2 h to obtain a mixed solution that had been mixed uniformly.

2) The mixed solution A was added with 0.4 parts of an oil-soluble initiator, and reacted at 80° C. for 0.5 h to obtain a component B.

3) The component B was added dropwise with 0.5 parts of a functional acrylic monomer or 1 part of a long-chain acrylate monomer as a third monomer, and continued to react for 4 h to prepare a fluorine-containing terpolymer surfactant.

4) 2.5 parts of the fluorine-containing terpolymer surfactant, 4 parts of an aniline monomer and 40 parts of water were uniformly mixed and reacted at room temperature for 1 h to obtain a milky white mixed solution C.

5) The mixed solution C was slowly added dropwise with 11.8 parts of an aqueous solution of oxidant, continued to react for 24 h, then filtered with suction, washed, and dried to obtain super-hydrophobic polyaniline.

6) 0.1 parts of the super-hydrophobic polyaniline as a corrosion inhibitor was uniformly compounded with 10 parts of a resin matrix to prepare the polyaniline super-hydrophobic composite anticorrosive paint doped with the fluorine-containing terpolymer surfactant.

The hydrophilic vinyl monomer was 2-methacrylamide-dodecyl sulfonic acid. The fluorine-containing acrylate monomer was dodecafluoroheptyl acrylate. The oil-soluble initiator was azobisvaleronitrile. The functional acrylic monomer was glycidyl methacrylate. The long-chain acrylate monomer was octadecyl acrylate and hexyl acrylate. The oxidant was potassium dichromate.

In the present invention, a fluorine-containing terpolymer surfactant is synthesized by solution polymerization for the first time, and the super-hydrophobic polyaniline is successfully prepared by using the fluorine-containing terpolymer surfactant as a soft template and dopant during aniline polymerization; and then the super-hydrophobic polyaniline, which is used as the corrosion inhibitor, is compounded with the resin matrix and then applied to the surface of the metal to improve the anti-corrosion performance of the metal. The introduction of the fluorine-containing acrylate monomer and the third monomer in the product of the present invention can realize the unification of the superhydrophobic performance, the anticorrosive performance and the system compatibility, solves the problems of poor water resistance and anticorrosive performance of the resin matrix itself, and can greatly improve the long-term anticorrosive performance of a metal when the product is used as the anticorrosive paint.

The above content is a further detailed description of the present invention in connection with specific preferred embodiments. It cannot be considered that the specific embodiments of the present invention are limited to this. For those of ordinary skills in the art to which the present invention pertains, several simple deductions or substitutions can be made without departing from the concept of the present invention, which should be regarded as belonging to the claimed scope of the present invention as determined by the submitted claims.

What is claimed is:

1. A method of preparing a terpolymer-doped polyaniline super-hydrophobic composite anticorrosive paint, comprising the following steps:
    by adopting solution polymerization, stirring a hydrophilic vinyl monomer, a fluorine-containing acrylate monomer and an oil-soluble initiator in a solvent evenly and carrying out a reaction, then adding a functional acrylic monomer or long-chain acrylate monomer as a third monomer for further reaction to obtain a fluorine-containing terpolymer surfactant;
    mixing the fluorine-containing terpolymer surfactant with an aniline monomer and an oxidant evenly, and carrying out a reaction to obtain super-hydrophobic polyaniline; and
    dispersing the prepared super-hydrophobic polyaniline evenly in a resin matrix to prepare the polyaniline super-hydrophobic composite anticorrosive paint.

2. The method of preparing a terpolymer-doped polyaniline super-hydrophobic composite anticorrosive paint according to claim 1, wherein according to parts by weight, each 10-20 parts of the hydrophilic vinyl monomer is added with 12-24 parts of the fluorine-containing acrylate monomer, 20-40 parts of N,N-dimethylformamide and 0.4-0.8 parts of the oil-soluble initiator; and then added with 0.1-0.5 parts of the functional acrylic monomer or 0.2-1 parts of the long-chain acrylate monomer as the third monomer.

3. The method of preparing a terpolymer-doped polyaniline super-hydrophobic composite anticorrosive paint according to claim 1, wherein the reaction temperature for the solution polymerization is 80-90° C.

4. The method of preparing a terpolymer-doped polyaniline super-hydrophobic composite anticorrosive paint according to claim 1, wherein according to parts by weight, each 2.5-3.5 parts of the fluorine-containing terpolymer surfactant is added with 4-4.8 parts of the aniline monomer, 40-60 parts of water and 9.8-11.8 parts of an aqueous solution of the oxidant.

5. The method of preparing a terpolymer-doped polyaniline super-hydrophobic composite anticorrosive paint according to claim 1, wherein according to parts by weight, each 0.1-0.5 parts of the super-hydrophobic polyaniline which is used as a corrosion inhibitor, is uniformly compounded with 10 parts of the resin matrix.

6. The method of preparing a terpolymer-doped polyaniline super-hydrophobic composite anticorrosive paint according to claim 1, wherein the hydrophilic vinyl monomer is at least one selected from the group consisting of 2-acrylamide-2-methylpropanesulfonic acid, 2-methacrylamide dodecyl sulfonic acid and 2-acrylamide-n-butylsulfonic acid;
    the fluorine-containing acrylate monomer is at least one selected from the group consisting of hexafluorobutyl acrylate, trifluoroethyl acrylate and dodecafluoroheptyl acrylate; and
    the oil-soluble initiator is at least one selected from the group consisting of benzoyl peroxide, tert-butyl ester benzoyl peroxide, azodiisobutyronitrile and azobisvaleronitrile in any ratio.

7. The method of preparing a terpolymer-doped polyaniline super-hydrophobic composite anticorrosive paint according to claim 1, wherein the functional acrylic monomer is at least one selected from the group consisting of glycidyl methacrylate and glycidyl acrylate.

8. The method of preparing a terpolymer-doped polyaniline super-hydrophobic composite anticorrosive paint according to claim 1, wherein the long-chain acrylate monomer is at least one selected from the group consisting of octadecyl acrylate, hexyl acrylate, hexyl methacrylate, 2-ethylhexyl acrylate, 2-ethylhexyl methacrylate, n-octyl acrylate and iso-octyl acrylate.

9. The method of preparing a terpolymer-doped polyaniline super-hydrophobic composite anticorrosive paint according to claim 1, wherein the oxidant is at least one selected from the group consisting of ammonium persulfate, potassium persulfate, ferric chloride and potassium dichromate.

10. The method of preparing a terpolymer-doped polyaniline super-hydrophobic composite anticorrosive paint according to claim 1, wherein the resin matrix is at least one selected from the group consisting of epoxy resin, acrylic resin and alkyd resin.

* * * * *